(12) United States Patent
Damgaard et al.

(10) Patent No.: US 8,118,542 B2
(45) Date of Patent: Feb. 21, 2012

(54) METHOD OF MOVING THE ROTATING MEANS OF A WIND TURBINE DURING TRANSPORTATION OR STAND STILL, METHOD OF CONTROLLING THE MOVING OF THE ROTATING MEANS, NACELLE, AUXILIARY DEVICE, CONTROL AND MONITORING SYSTEM AND USE HEREOF

(75) Inventors: Søren Damgaard, Ringkøbing (DK); Arne Haarh, Ringkøbing (DK); Nils Bjørn Jensen, Vejen (DK)

(73) Assignee: Vestas Wind Systems A/S, Aarhus N (DK)

( * ) Notice: Subject to any disclaimer, the term of this patent is extended or adjusted under 35 U.S.C. 154(b) by 12 days.

(21) Appl. No.: 12/549,974

(22) Filed: Aug. 28, 2009

(65) Prior Publication Data

US 2010/0013239 A1     Jan. 21, 2010

Related U.S. Application Data

(63) Continuation of application No. 10/550,442, filed as application No. PCT/DK03/00196 on Mar. 21, 2003, now Pat. No. 7,600,971.

(51) Int. Cl.
*F01D 21/04* (2006.01)
*F01D 21/12* (2006.01)
*F01D 21/14* (2006.01)
*F01D 15/12* (2006.01)
*F01D 25/36* (2006.01)

(52) U.S. Cl. .................. 415/124.1; 415/123; 416/170 R

(58) Field of Classification Search .................. 415/123, 415/124.1; 416/1, 170 R
See application file for complete search history.

(56) References Cited

U.S. PATENT DOCUMENTS

| 2,335,692 | A | | 11/1943 | Murray |
| 2,527,977 | A | * | 10/1950 | Voigt ............................. 105/106 |
| 2,725,241 | A | | 11/1955 | Leonard, Jr. |

(Continued)

FOREIGN PATENT DOCUMENTS

AT     3574 U1     5/2000

(Continued)

OTHER PUBLICATIONS

International Preliminary Examination Report; PCT/DK2003/000196; Aug. 16, 2005; 17 pages.

(Continued)

*Primary Examiner* — Edward Look
*Assistant Examiner* — Sean J Younger
(74) *Attorney, Agent, or Firm* — Wood, Herron & Evans, L.L.P.

(57) ABSTRACT

Methods of moving a rotating device of a wind turbine during transportation or standstill are provided. The methods include securing at least one auxiliary device to a position and connecting the device to one or more shafts of the rotating device at transportation or standstill. The auxiliary device is able to store, generate and/or convert energy during transportation, transferring energy continuously from at least one auxiliary device to one or more shafts of the rotating device during transportation or standstill, and moving one or more shafts of the rotating device continuously or discontinuously from a position to another. Also provided is a nacelle for a wind turbine, an auxiliary device, a control system for controlling moving of a rotating device of a wind turbine nacelle during transportation of the nacelle and use thereof.

33 Claims, 10 Drawing Sheets

U.S. PATENT DOCUMENTS

| | | | |
|---|---|---|---|
| 2,808,288 A | 10/1957 | Benson | |
| 4,490,093 A * | 12/1984 | Chertok et al. | 416/26 |
| 4,503,673 A * | 3/1985 | Schachle et al. | 60/398 |
| 4,774,855 A * | 10/1988 | Murrell et al. | 475/31 |
| 5,225,712 A * | 7/1993 | Erdman | 290/44 |
| 5,947,665 A | 9/1999 | Baur et al. | |
| 6,408,575 B1 * | 6/2002 | Yoshida et al. | 52/40 |
| 7,418,820 B2 * | 9/2008 | Harvey et al. | 60/487 |

FOREIGN PATENT DOCUMENTS

| | | |
|---|---|---|
| CH | 333380 A | 10/1958 |
| DE | 1040852 B | 10/1958 |
| DE | 3344449 A1 | 11/1984 |
| DE | 20021026 U1 | 3/2001 |
| DE | 10031473 C1 | 2/2002 |
| DE | 10133242 A1 | 1/2003 |
| EP | 1228310 B1 | 8/2002 |
| EP | 1336755 A1 | 8/2003 |
| EP | 1465789 B1 | 4/2008 |
| GB | 782002 A | 8/1957 |
| GB | 1204412 A | 9/1970 |
| GB | 2201200 A | 8/1988 |
| WO | 03031812 A1 | 4/2003 |

OTHER PUBLICATIONS

International Search Report; PCT/DK03/00196; Sep. 2, 2003; 2 pages.

Erich Hau "Windkraftanlagen"; Jul. 1995; 12 pages.

* cited by examiner

METHOD OF MOVING THE ROTATING MEANS OF A WIND TURBINE DURING TRANSPORTATION OR STAND STILL, METHOD OF CONTROLLING THE MOVING OF THE ROTATING MEANS, NACELLE, AUXILIARY DEVICE, CONTROL AND MONITORING SYSTEM AND USE HEREOF

CROSS-REFERENCE TO RELATED APPLICATIONS

The present application is a continuation of U.S. patent application Ser. No. 10/550,442, filed May 19, 2006, now U.S. Pat. No. 7,600,971 which is a national phase of International patent application PCT/DK2003/000196 filed on Mar. 21, 2003. The content of all prior applications is incorporated herein by reference.

FIELD OF THE INVENTION

The invention relates to a method of moving the rotating means of a wind turbine during transportation or stand still, a method of controlling the moving of the rotating means, a nacelle, an auxiliary device, a control and monitoring system and use of an auxiliary device.

BACKGROUND OF THE INVENTION

In recent years, the size of wind turbines has increased significantly which has resulted in still larger, heavier and more complex wind turbine components. Especially, components of the nacelle together with the wind turbine rotor have increased both in size, weight and complexity. In order to meet the increased size and weight of the nacelle components, as well as the increased size of the rotor, the nacelle has also increased in size and weight.

The increased size and complexity of different components in the wind turbines, such as the nacelle and the wind turbine rotor, have resulted in production at large and specialized production plants. The plants are often positioned in a rather few central locations around the world and thus relying on transporting many of the different components in wind turbines over long distances to the places of erection. The transportation of wind turbine components may primarily involve trains or ships. Further, the transportation may include large trucks and combinations of trains, ships and trucks.

The transportation of the nacelle of a wind turbine over long distances involves problems as the nacelle includes a number of components with rotating means. The components include not only the gear, but also the one or more generators which all have shafts rotating during normal use of the wind turbine in a number of bearings and engaging with toothed wheels of the gear. During the long transportation, the protective oil films that separate the rotating means from the bearing and toothed wheels from each other may be ruptured or vanish due to vibrations and the weight of the shafts, resulting in damage to the shafts, the bearings or the toothed wheels. Continuos low frequency vibrations, such as vibrations from a ship engine, may be especially harmful to the components in question.

The damage is often quite small in size, e.g., less than $\frac{1}{1000}$ millimeter, and thus not be visible to the human eye but may nevertheless result in a reduced lifespan for the components.

In order to avoid the problem, the rotating means may be equipped with transportation furnishings at the shaft ends. The furnishings allow the shafts to be held in a position in which the weight is not transferred to the bearings. The furnishings are however less useful in connection with the gear and especially the toothed wheels due to the structural nature of the gear.

Further, furnishings are difficult and time consuming to position correctly in a nacelle before the transportation starts.

An object of the invention is to establish methods and system for wind turbines without the above-mentioned disadvantage and especially without the rupturing or vanishing of the oil film in rotating means of a wind turbine such as gears and generators.

A further object of the invention is to establish control systems for monitoring and optimizing the established methods and system for wind turbines.

SUMMARY OF THE INVENTION

The invention relates to a method of moving the rotating means of a wind turbine during transportation, said method including the steps of:
  securing at least one auxiliary device to a fixed position in relation to the rotating means,
  connecting the at least one auxiliary device to the rotating means at the transportation, the at least one auxiliary device being able to store, generate and/or convert energy during transportation,
  transferring energy from the at least one auxiliary device to the one or more shafts of the rotating means during transportation, and moving the one or more shafts of the rotating means continuously or discontinuously from a position to another.

Hereby, it is possible to protect the rotating means during longer periods of standstill before the erection of the wind turbine, e.g., during transportation. It is possible to eliminate standstill marks on the rotating means of a wind turbine as the rupturing or vanishing of the oil film is avoided. In particular, microscopic standstill marks can be avoided on the toothed wheel of the gear and the generator bearings, and the potential lifetime of the rotating means are thus significantly improved.

The term "rotating means" is to be understood as means of a wind turbine which under normal use is part of the components in the nacelle, such as the gear and the generator. The rotating means may, among the nacelle components, be a gear or generator, which comprise rotating shafts, bearings and toothed wheels.

In an aspect of the invention, the rotating means is included in a nacelle of a wind turbine or in a transportation frame construction.

It shall be emphasized that the transportation may be of the nacelle including the rotating means and the auxiliary device or the rotating means and the auxiliary device alone, e.g., the transportation of a gear or a generator of a wind turbine and the auxiliary device in a transportation frame construction. The construction may in a simple version be the necessary means for securing the gear or a generator to the platform of the transportation means and protecting the gear or a generator against the weather conditions, e.g., a tarpaulin covering the gear and the generator. The version may further include means for ensuring that the auxiliary device and the rotating means are not entangled in the tarpaulin or the like, in which the means may, for example, be brackets or rods. In more advanced versions, the tarpaulin may be replaced with more solid wall structures.

In a further aspect of the invention, the auxiliary device is connected to one or more shafts such as the high-speed shaft at the gear and/or the generator. Hereby, it is possible to change the position, for example, of the toothed wheels or bearings of gears or generators, and thus avoid the rupture or vanish of an oil film.

In a further aspect of the invention, the one or more shafts are turned at a very low turning speed, such as less than one full turn per week, for example, between 1 and 20 degrees per day. The low turning speed ensures that the needed power for the turning is reduced significantly compared to the normal "high speed". The turning speed will be significant enough to ensure that metal surfaces will not penetrate the oil film and touch each other.

In an even further aspect of the invention, the moving of the rotating means is discontinuous, for example, between 30 seconds and 20 minutes of movement every period, such as 1 minute movement every 3 hours. Hereby, it is possible to reduce the needed power for the turning to a minimum and thus ensure that the energy storage may be kept compact or last longer.

In another aspect of the invention, the moving of the one or more shafts of the rotating means is combined with oil lubrication at the rotating means. The use of oil lubrication during the turning or moving process further reduces the necessary turning speed as the oil film is continuously strengthened. Hereby a certain rupture or vanish of the oil film in rotating means can be accepted without the metal surfaces touching each other and thus stand still marks occur.

In a further aspect of the invention, the transportation is performed with transportation means such as trucks, trains or ships. The invention is especially relevant to transportations over a longer time period that normally introduces the possibility of dangerously long stand stills.

In a further aspect of the invention, the auxiliary device is connected to one or more energy generating systems of the transportation means, such as the electric generators, pneumatic or hydraulic pumps. By using the energy generating systems of the transportation means, it is possible to ensure a reliable power supply to the auxiliary device. The energy generating systems may be prepared for the connection, for example, by establishing power outlets at the transportation platform for the rotating means.

Further, the invention relates to a method of moving the rotating means of a wind turbine during stand still, the method comprising the steps of:
 at least one auxiliary device being secured to a fixed position in relation to said rotating means and connected to the rotating means, said at least one auxiliary device being able to store, generate and/or convert energy during stand still,
 transferring energy from said at least one auxiliary device to said one or more shafts of the rotating means during stand still, and
 moving said one or more shafts of the rotating means continuously or discontinuously from a position to another.

Hereby, it is further possible to protect the rotating means during periods of standstill, for example, longer periods in storage facilities.

The invention also relates to a method of controlling the moving of the rotating means of a wind turbine during transportation or stand still, the method including a control and monitoring system including an algorithm, the system comprising:
 inputs signal from one or more of sensors,
 controlling at least one auxiliary device with output signals of said control and monitoring system in order to move the rotating means of the wind turbine during transportation or stand still,
 wherein said output signal is derived from said input signals and/or time signals.

Hereby, it is possible to protect the rotating means of the wind turbine from potential damage during transportation or stand still. The potential lifetime of the rotating means may thus be significantly improved, especially as the algorithm may use the input and/or time signals in order to create an output signal controlling the at least one auxiliary device in a preferred and advanced manner.

Even further, the invention relates to a nacelle for a wind turbine defining an enclosed space, the nacelle including:
 rotating means such as gear and/or generators including one or more shafts, and
 at least one auxiliary device being secured to a fixed position in the nacelle with securing means and connected to the rotation means with connection means,
 wherein the auxiliary device moves the rotating means of the wind turbine nacelle during transportation or standstill of the wind turbine nacelle.

Hereby, it is possible to protect the rotating means of the nacelle from potential damage during transportation or stand still. The potential lifetime of the rotating means may thus be significantly improved.

In an embodiment, the connection means is a belt arrangement including a belt, belt pulleys at the one or more shafts, at least one bracket secured to a position in the nacelle and a belt pulley of he at least one auxiliary device. Hereby, a reliable and simple movement transfer from the auxiliary device to the one or more shafts is established. The auxiliary device with the bracket is preferably positioned just above the one or more shafts, for example, at the frame of the rotating means, allowing the length of the belt to be as small as possible.

In another embodiment, the gear and/or the generator belt pulleys have different sizes in relation to belt pulley of the at least one auxiliary device, for example, being significantly larger in diameter. By the difference in pulley size, a gearing between the auxiliary device and the shaft is achieved, ensuring that an advantageous relation in turning speeds of the two may be chosen.

In another embodiment, the connection means is a cardan coupling system flexibly connecting the high-speed shaft ends of the gear and/or the generator with the at least one auxiliary device. With the use of a cardan coupling, a multi-faceted movement transfer is possible, for example, with the movement of the gear and generator with one auxiliary device. Further, the positioning of the auxiliary device is less restricted with a cardan coupling compared to a belt arrangement.

In a further embodiment, the cardan shaft system includes gearing means in the connection between the shafts and the at least one auxiliary device. With the gearing, an advantageous relation in turning speeds of the auxiliary device and the shaft may be chosen.

In a further embodiment, the rotation means is mounted on the nacelle with flexible rubber bushings. The rubber bushings may preferably be introduced between the rotating means, such as the gear or generator, and the nacelle floor and thus reduce the transfer of vibrations to the gear or generator. With the reduction of vibrations the necessary movement of the rotating means may also be reduced, allowing the size of the auxiliary device including power supply to be diminished, for example, allowing a smaller model or type of an auxiliary device to be chosen.

The invention also relates to an auxiliary device for moving the rotating means of a wind turbine during transportation or standstill of the wind turbine, the device including:

securing means for securing the auxiliary device to a fixed position in relation to the rotating means, connection means for connecting the auxiliary device to the rotating means converting means for converting an internal or external energy source to mechanical force, and means for continuously or discontinuously transferring the mechanical force to the rotating means through the connection to the rotating means.

Hereby, it is possible to protect the rotating means from potential damage during transportation or stand still. The potential lifetime of the rotating means may thus be significantly improved.

The invention also relates to a control and monitoring system for controlling the moving of the rotating means of a wind turbine with at least one auxiliary device during transportation or stand still, the system including:

input signals from one or more sensors,
at least one time signal generator, and
one or more algorithms,
where the at least one auxiliary device is controlled with output signals from the one or more algorithms in order to move the rotating means of the wind turbine during transportation or stand still, the output signal being derived from the input signals.

Hereby, it is possible to monitor, improve and optimize the functionality of the auxiliary device and the moving of the rotating means of a wind turbine, for example, in relation to the power supply.

Lastly, the invention relates to the use of an auxiliary device and/or a control and monitoring system as a unit for supplementary connection to one or more shafts of rotating means in a wind turbine at transportation or other types of stand still.

With the supplementary connection it is possible to use the auxiliary device as a device connected with the rotating means when needed and remove it when not needed. The auxiliary device is thus an extra unit supplementary connected to the existing means of a wind turbine, such as the rotating means of a wind turbine nacelle.

BRIEF DESCRIPTION OF THE DRAWINGS

The invention will be described in the following with reference to the figures in which.

DETAILED DESCRIPTION OF THE INVENTION

Figure 1:
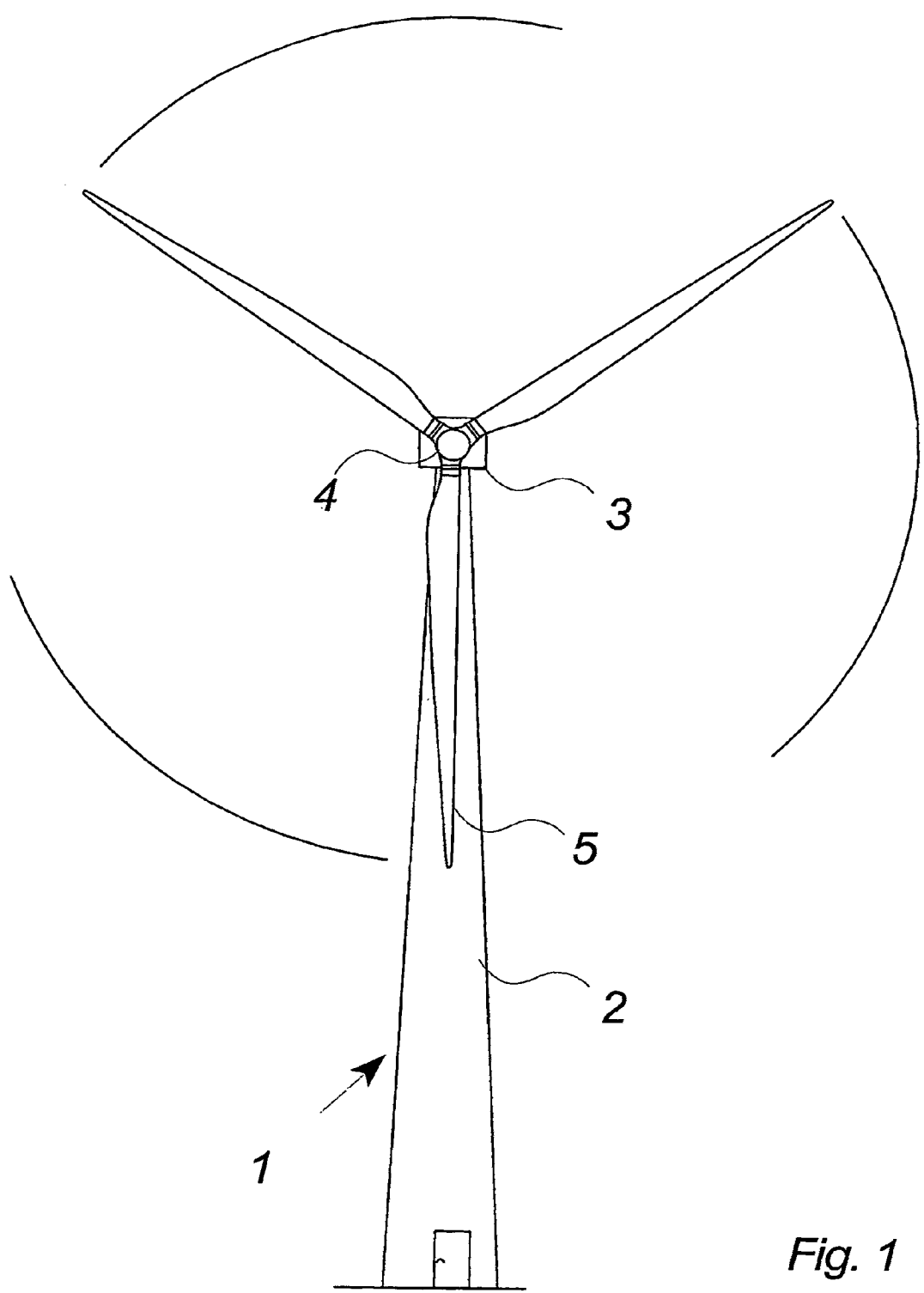
FIG. 1 illustrates a large modem wind turbine.

FIG. 1 illustrates a modern wind turbine 1 with a tower 2 and a wind turbine nacelle 3 positioned on top of the tower.

The wind turbine rotor 5, comprising three wind turbine blades, is connected to the nacelle through the low speed shaft which extends out of the nacelle front.

As illustrated in the figure, wind beyond a certain level will activate the rotor due to the lift induced on the blades and allow it to rotate in a perpendicular direction to the wind. The rotation movement is converted to electric power, which is usually supplied to the transmission grid as known by skilled persons within the area.

Figure 2:
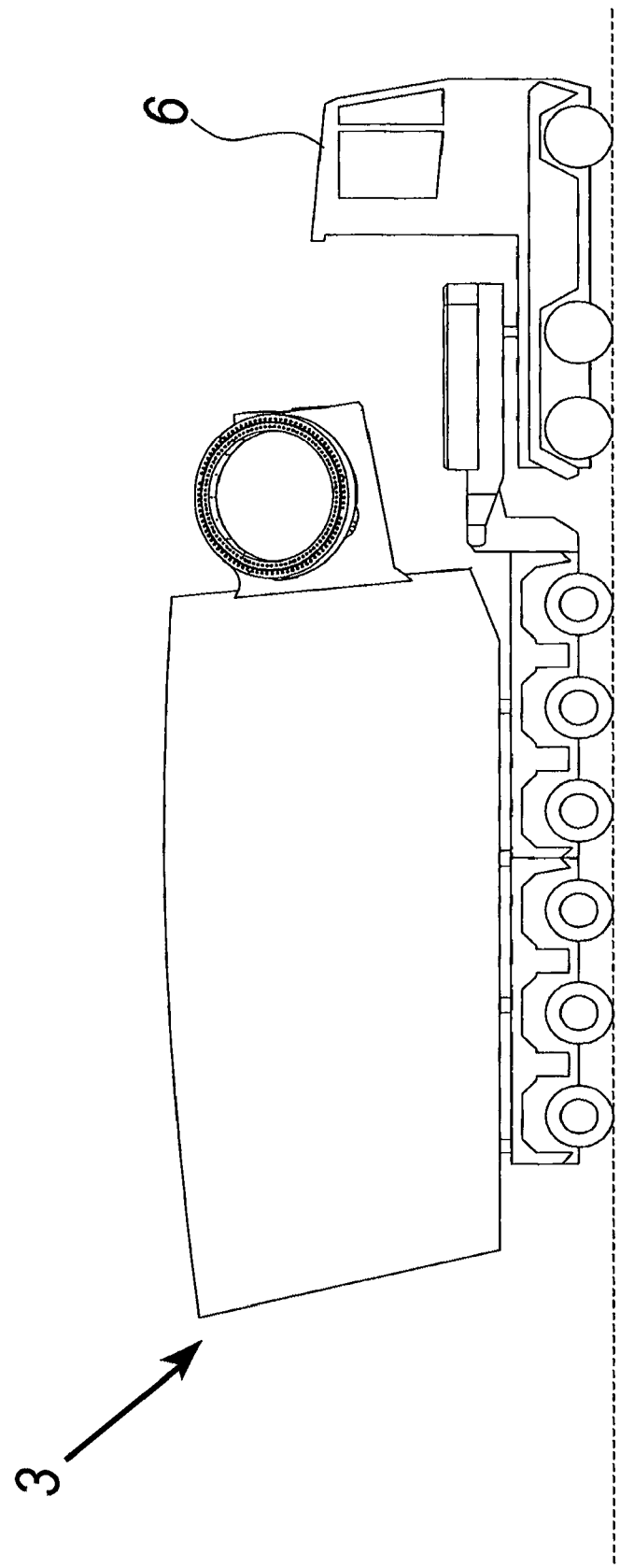
FIG. 2 illustrates a transportation situation of a nacelle.

FIG. 2 illustrates a common used method of transporting a wind turbine nacelle 3 from a production plant to a place of erection for a wind turbine.

The truck 6 is loaded with the nacelle at the production plant and at the erection place a crane lifts the nacelle and positions it on top of the previously erected tower.

The truck transportation can be the end of a long nacelle transportation that also may involve train and/or ship voyages as well as one or more intermediate positions of storage.

The transportation of the nacelle may also end with a ship voyage to an offshore erection place in which the nacelle is lifted to the tower top from the ship storage facilities.

Other transportation means for the nacelle is also possible, such as air transportation, but less practical due to, for example, transportation costs.

Besides transportation of nacelles to the erection places for the wind turbine, transportation may also be of components in the nacelle, for example, to the production plant of wind turbines. Examples of components may be the gear and generators being transported to the production plant with transportation means.

During transportation every component is integrated in a transportation frame construction ensuring a secure connection to the transportation means and protecting the component against, for example, rough weather conditions and the like.

During transportation of the components, in the nacelle or alone, the different components face vibrations and a continuous down force.

Figure 3A:
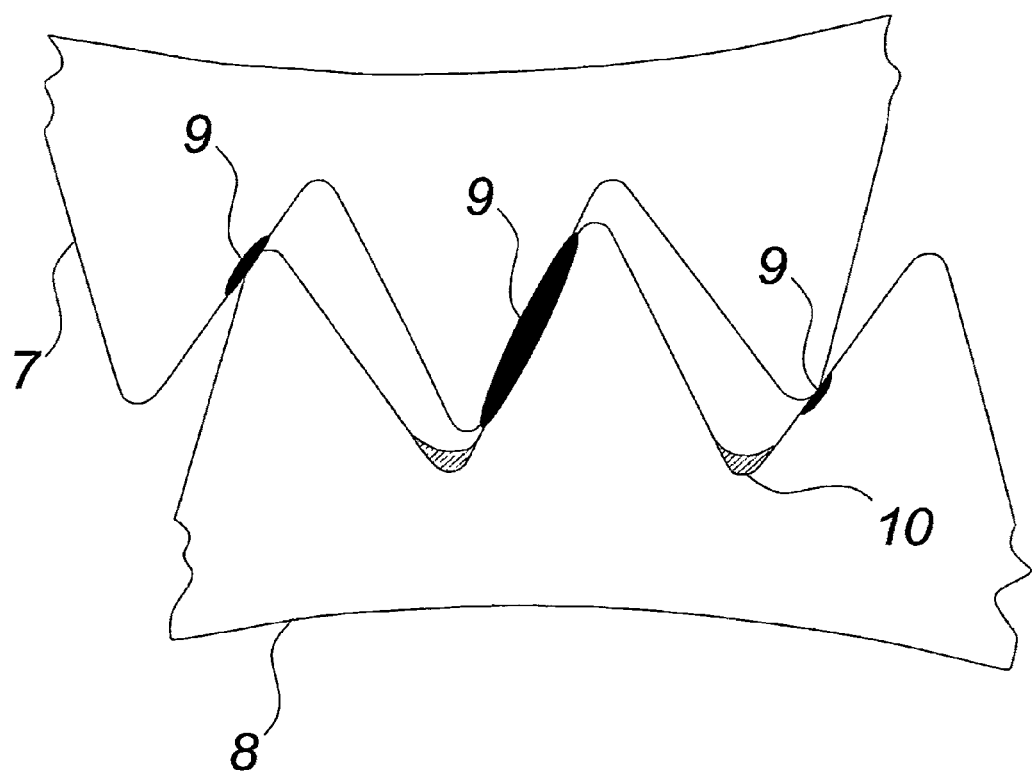
FIG. 3a illustrates a section of a toothed wheel in a gear.

FIG. 3a illustrates a section of a toothed wheel in a gear in which the consequences of vibrations and a continuous down force at the same position is illustrated.

The first toothed wheel 7 is forced against the second toothed wheel 8 at few positions during the stand still. At the positions are generated standstill marks 9 in the toothed wheels. Further, it is illustrated how the oil film 10 is collected at the lower positions.

Figure 3B:
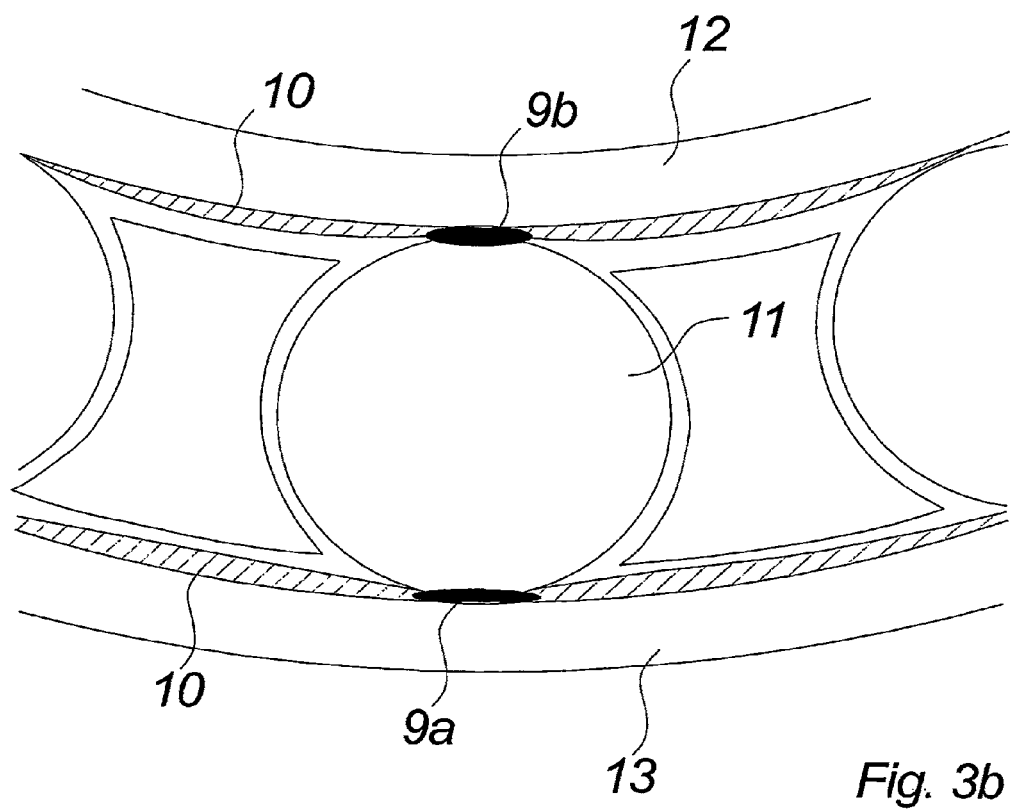
FIG. 3b illustrates a section of a bearing e.g. in a gear or generator.

FIG. 3b illustrates a section of a bearing, for example, in a gear in which the consequences of vibrations and a continuous down force at the same position is illustrated.

The inner ring of the bearing 12 is forced against the bearing roller 11 which again is forced against the outer ring 13 making stand still marks 9a, 9b in the rings and the roller as the oil film 10 is forced away.

Further, the standstill marks 9b may occur solely due to vibrations of the bearing roller 11 which little by little deteriorating the oil film.

Figure 4:
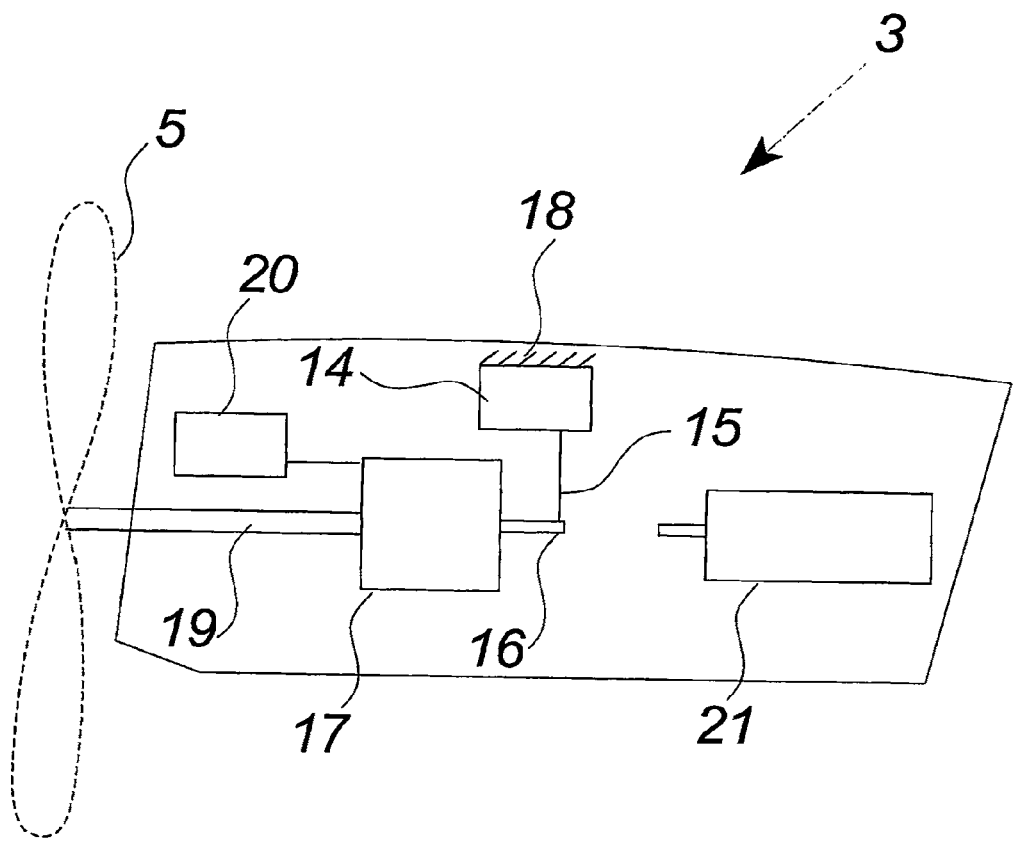
FIG. 4 illustrates schematically a first embodiment of a nacelle according to the invention during transportation.

FIG. 4 illustrates schematically a first embodiment of a nacelle according to the invention and during transportation.

The nacelle comprises a number of components including the gear 17 connected to the low speed shaft 19 at one end and the high-speed shaft 16 at another. Further, it is illustrated that the high-speed shaft is ready for the normal use connection to the electric generators 21.

The gear 17 also comprises a connection to an oil lubrication system 20, supplying oil lubrication in the gear. The lubrication system may be a splashed or forced lubrication system. Further, the system may be a combination of the two types of lubrication systems. The oil lubrication system also, comprises necessary components such as lubrication reservoirs, oil heater and cooler, one or more pumps and oil filters.

The supplied oil creates an oil film at the contact surfaces of the gear during normal rotating use and protects and separates the metal surfaces from each other.

The oil lubrication system preferably comprises an electric pump capable of pumping the oil into the gear. The electric pump may be powered from the auxiliary device during transportation or from its own electric power supply such as electric accumulators.

Further, the pump may in another embodiment be driven by a mechanical force instead of an electric power supply.

During normal use the electric pump may be a part of the oil lubrication system facilitating the oil pumping alone or together with one or more other pumps.

Further, the electric pump may be solely for transportation use, allowing the pump to be adapted to the special conditions of transportation including the possibility of a limited power supply.

The frame of the auxiliary device 14 is directly or indirectly fixed to the nacelle, for example, with securing means 18, and the drive shaft of the device is connected to the high-speed shaft 16 at the gear 17 through a connection 15.

The connection 15 may be any type of connection allowing transmission of force from the auxiliary device 14 to the shaft, for example, a belt or chain connection.

Figure 5:
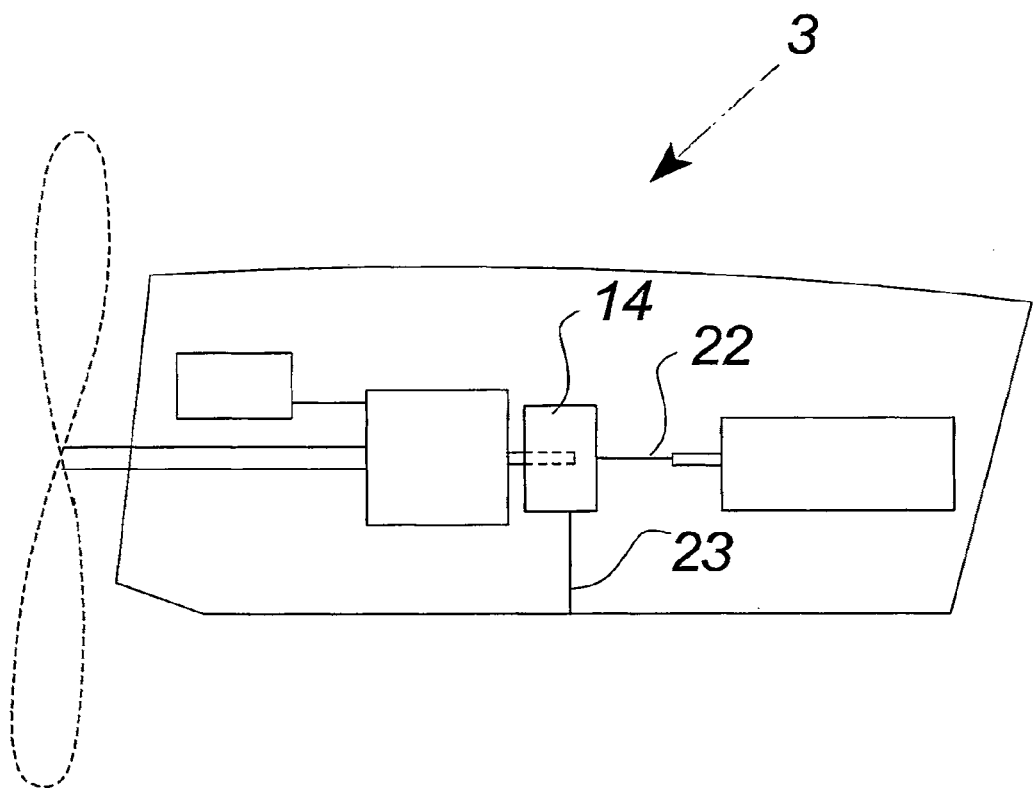
FIG. 5 illustrates schematically a second embodiment of a nacelle according to the invention during transportation.

FIG. 5 illustrates schematically a second embodiment of a nacelle according to the invention and during transportation.

The embodiment includes an auxiliary device 14 mounted directly to or on the high-speed shaft of the gear.

The auxiliary device 14 further comprises a direct or indirect connection to the interior of the nacelle 3 in order to fixate the auxiliary device to the nacelle at the rotation of the shaft. The connection may be achieved, for example, by a furnishing fixating the frame of the auxiliary device to the frame of the gear or the inner surface of the nacelle.

In general, the auxiliary device is to be seen as a separate and compact unit that is positioned in the nacelle and connected to the high-speed shaft and oil pump at the voyage start. After the arrival at an erection place, the auxiliary device is removed from the nacelle in order to be used again at other nacelle transportations.

However, the auxiliary device or parts of the device may also be an integrated part of the nacelle used only during transportation or situations in which the gear of the nacelle is not moved for a considerable period of time.

The actuation may be a continuous actuation of the high-speed shaft or an actuation in which the force is released discontinuously.

The high-speed shaft is actuated due to the higher gearing compared with the low speed shaft making it easier to move the high-speed shaft.

The auxiliary device may be chosen among a number of system solutions, such as: (a) a motor that is supplied with electric power from an internal or external electric power source in relation to the nacelle; (b) an engine that uses a variety of non electrical fuels such as diesel, gasoline or other fossil fuels; (c) a mechanical energy generator; and (d) other examples of mechanical energy generators.

With the solution (a) above, the electric power may preferably also supply the electric pump capable of pumping oil into the gear.

With the solution (b) above, the motor may further be fuelled by a chemical conversion involving hydrogen, oxygen or similar highly active fluids. The different fuels may be supplied from internal or external storages in compressed or not compressed form. The fumes from the combustion of fossil fuels are guided in tubes to an exterior opening in the nacelle or further away if necessary.

The motor may also drive an electric generator in order to supply both mechanical and electric power. In an embodiment, the motor and generator combination can be a standard diesel or gasoline generator, which will be familiar to the skilled person.

Further, the motor and generator combination may in a preferred embodiment be used solely to supply electric power, for example, to an electric motor as described in solution (a). In this embodiment the motor and generator combination may be positioned outside the nacelle with a cable connection to the electric motor positioned in proximity of the high-speed shaft.

With the solution (c) above, the generator may involve a number of different solutions such as helical or leaf springs or torsion bars. The springs or torsion bars are compressed or in other ways tensioned at the voyage start in order to establish enough force to perform a controlled mechanical actuation of the high-speed shaft.

With the solution (d) discussed above, the mechanical energy generators may be combined with electric power supplied from electric accumulators, solar cells or the like in order to drive, for example, the electric pump. The pump may however also be driven by mechanical force supplied from the mechanical energy generators instead of using electric power.

The generators may involve pneumatic or hydraulic systems supplied with compressed air or hydraulic oil, respectively.

The mechanical energy generators may be combined with a separate electric power supply as described above or drive their own electric generator in order to generate electric power.

The above mentioned energy sources are examples of internal (positioned inside the nacelle or a transportation frame) or external (positioned outside the nacelle or a transportation frame and supplied to the nacelle or a transportation frame) energy sources. The energy of the energy sources are converted by converting means to mechanical force in which the force is transferred, for example, to the rotating means. The converting means may, for example, be seen as motors, engines, etc. as described above and below.

Combinations of the abovementioned system solutions are also possible, for example, in order to establish a redundant energy system in case of failure, low power or power loss of the primary energy system. The redundant energy system may comprise electric accumulators, pneumatic or hydraulic storages, and solar cells such as movable carpets of solar cells.

The auxiliary device of (a) may preferably be supplied with electric power via a connection to the energy systems of the transportation means, for example, the electric generator of a truck, train or ship. The transportation means may comprise specialized facilities at the nacelle proximity, such as electricity distribution boxes in order to facilitate an easy connection between the energy systems and the nacelle.

The hydraulic system of (d) may preferably be supplied from the hydraulic pump system of the transporting truck, train or ship. The necessary compressed air may be supplied from the truck, train or ship or from one or more container tanks in or outside the nacelle, for example, next to the electric accumulators if accumulators are being used by the systems.

The solar cells may preferably be positioned on one or more of the upper surfaces of the nacelle or as separate, movable carpets.

The auxiliary device preferably comprises a control and monitoring system which manages the auxiliary device during the transportation.

The control and monitoring system may control the auxiliary device to move the high-speed shaft and the oil pump continuously or discontinuously by using an algorithm comprising different input parameters such as shaft turning speed, vibrations, oil film condition and energy levels. Further, different temperature and pressure inputs such as outside air temperature, temperature in the nacelle, the gear and generator bearing temperature, oil temperature and oil pressure may be obtained and used in controlling the auxiliary device optimally.

The oil pump may be synchronized with the normal working periods of the auxiliary device and thus create a lubrication supply when the gear and/or generator is moved but the pump may also work partly independently of the movement, for example, periodically forcing oil in between the toothed wheels of the gear while they are not moving.

The turning speed of the gear and generator is preferably very low, such as a few degrees every day, for example, between 1 and 20 degrees, resulting in less than a full rotation every week, which is sufficient enough to avoid oil film rupture and standstill marks in the toothed wheels, bearings and the like. If the power supply to the auxiliary device is relatively unlimited, a higher rotation speed may be chosen, for example, if the transport road is rugged as will be explained below.

Especially if the turning of the gear and/or generator is performed as a discontinuous and stepped function, it is important that the control and monitoring system knows the position of the high-speed shaft in order to avoid long time vibration and weight exposure at the given position. Further, by knowing the exposure position and the period of exposure time, it is possible to reduce the future exposure at the position, as well as decide the next time to supply oil into the gear and generator.

In a preferred embodiment of the invention, the control and monitoring system controls the auxiliary device and the gear and generator discontinuously with a full turn of the gear and generator during one month. The auxiliary device moves the high-speed shaft of the gear and generator during one minute every three hours. The resulting movement every day is thus 12 degrees at a 30 day month and 1.5 degree during the one minute movement.

The nacelle will naturally endure vibrations during the transportation in which some will be more severe than others. The control system and the algorithm may thus comprise thresholds defining the size of vibration shocks that should trigger an unscheduled acceleration or activation of the auxiliary device and the movement process.

The oil film condition may also be controlled by the control and monitoring system, for example, by calculating the time period since the last oil supply with reservations for unscheduled acceleration or activation or the like.

Further, the pressure in the oil lubrication system may be monitored in order to detect any pressure loss, for example, loss due to cracks or holes in the oil pipes. The pressure may be monitored between one or more preset threshold pressure values by pressure sensors.

The energy levels of the energy storage or storages may be monitored in relation to preset information regarding the transportation time in order to secure a continuous or discontinuous turning of the gear throughout the whole transportation.

If the energy level falls to a level indicating that there will not be sufficient energy to the whole transportation, the turning speed may be lowered or converted from a continuous to a discontinuous drive in order to preserve the remaining energy.

Further, any redundant energy storage may be utilized, e.g., electric accumulators as explained above.

The control system may comprise data storage means that stores monitored information regarding the transportation.

If the control system detects one or more fail situations that may be harmful for the different rotation means of the nacelle, the control system may transmit alarm signals to the person responsible for transportation, for example, the driver of the truck or the captain of the ship. Further, the signal may be transmitted to a remote control center, for example, the production plant.

The signals may preferably be a wireless signal that identifies the nacelle, the problem and preferably the position of the nacelle, for example, with the use of mobile telephone systems together with GPS systems or satellite based maritime communication systems.

Figure 6:
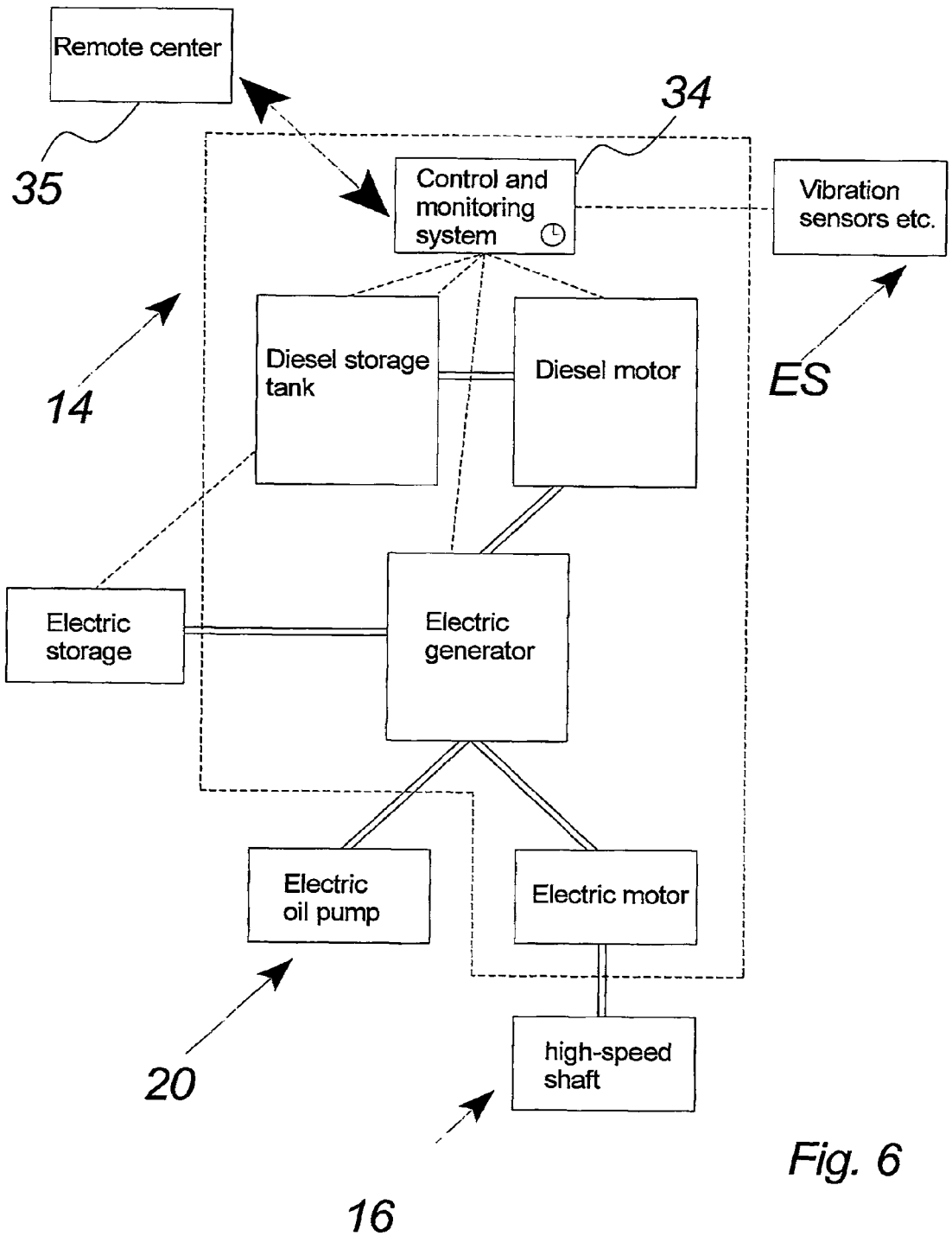
FIG. 6 illustrates a block diagram of a preferred embodiment of the auxiliary device.

FIG. 6 illustrates a block diagram of a preferred embodiment of the auxiliary device and the connected means.

The block diagram shows the components of a preferred embodiment of the auxiliary device 14 together with the direct connected means, such as the high-speed shaft 16 and the electric oil pump 20.

The auxiliary device includes a diesel machine with a diesel motor connected with and driving an electric generator, as well as the high-speed shaft of the gear through its diesel motor shaft.

The diesel machine is supplied with diesel from a diesel storage tank and may discharge exhaust gas through an opening in the nacelle to the exterior.

The electric generator supplies the electric oil pump with the necessary electric power. Further, the generator may supply an electric storage such as a number of electric accumulators. The accumulators may comprise a connection to the electric oil pump allowing the pump to be supplied with electric power without the diesel machine needs to be started.

Some or all the components in the auxiliary device 14 are controlled and monitored from the control and monitoring system including clock means.

As described above, the control and monitoring system comprises a number of internal and external sensors monitoring the status of the different components of the auxiliary device and the external components connected to the auxiliary device. Further, the control and monitoring system may comprise a number of external sensors monitoring conditions.

Figure 7:
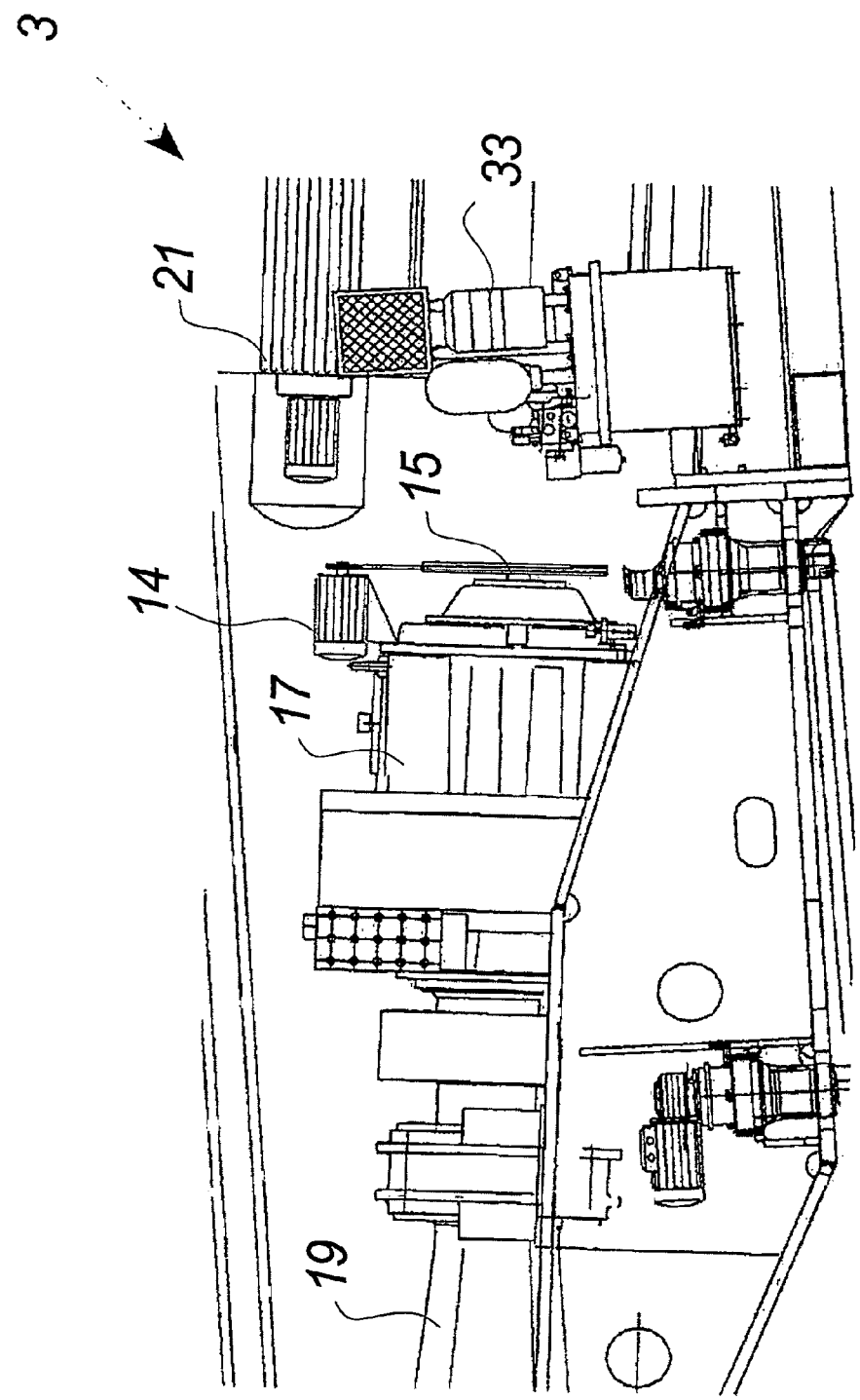
FIG. 7 illustrates a nacelle including an auxiliary device according to a preferred embodiment of the invention.

FIG. 7 illustrates a nacelle including an auxiliary device according to a preferred embodiment of the invention.

The figure shows the auxiliary device 14 in the form of an electric motor connected to a diesel generator system, as described in connection with the block diagram of the previous figure.

The electric motor is steadily positioned at the top of the framework of the gear 17. Further, the shaft of the electric motor is connected with a connection 15 to the high-speed shaft of the gear. The connection is a belt connecting a belt pulley of the motor shaft to a belt pulley of the gear.

The figure also illustrates other nacelle components, such as the hydraulic system 33 for pitching the wind turbine blades, the low speed shaft 19 and the electric generator 21.

The high speed shaft is usually separated in two shaft ends before normal use of the wind turbine, the ends extending from the gear and the generator, respectively. At the erection of the wind turbine, the shaft ends are flanged together.

The present embodiment may temporarily connect the shaft ends in order to move both shaft ends, separately connect the auxiliary device(s) to each high-speed shaft end or just move one of the shaft ends, e.g. the shaft end of the gear.

In order to reduce the transfer of vibration to the different components of the nacelle, the components, such as the gear and generator, may be mounted on the nacelle with flexible rubber bushings.

Figure 8:
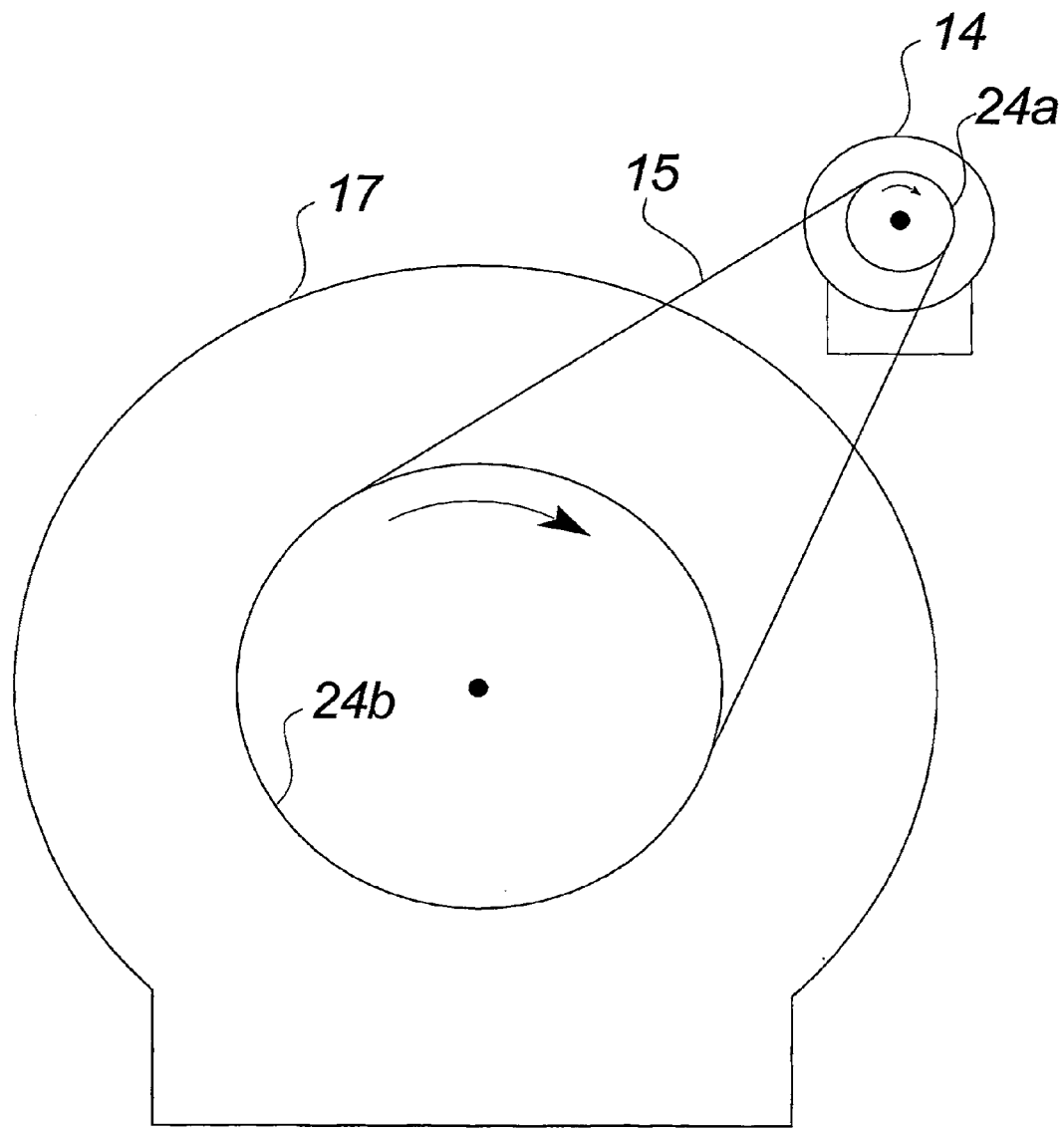
FIG. 8 illustrates the transmission of movement to the high-speed shaft at the gear according to a preferred embodiment of the invention.

FIG. 8 illustrates the connection 15 of FIG. 7 in more details, including the transmission of movement to the high-speed shaft at the gear.

The connection 15 between the auxiliary device 14 and the high-speed shaft at the gear is achieved with a belt. The moment of force applied to the high-speed shaft is enhanced with a transmission between the small belt pulley 24a at the auxiliary device and a large belt pulley 24b at the shaft.

It shall be emphasized that the belt system may easily be modified to move both the gear and the generator.

Figure 9:
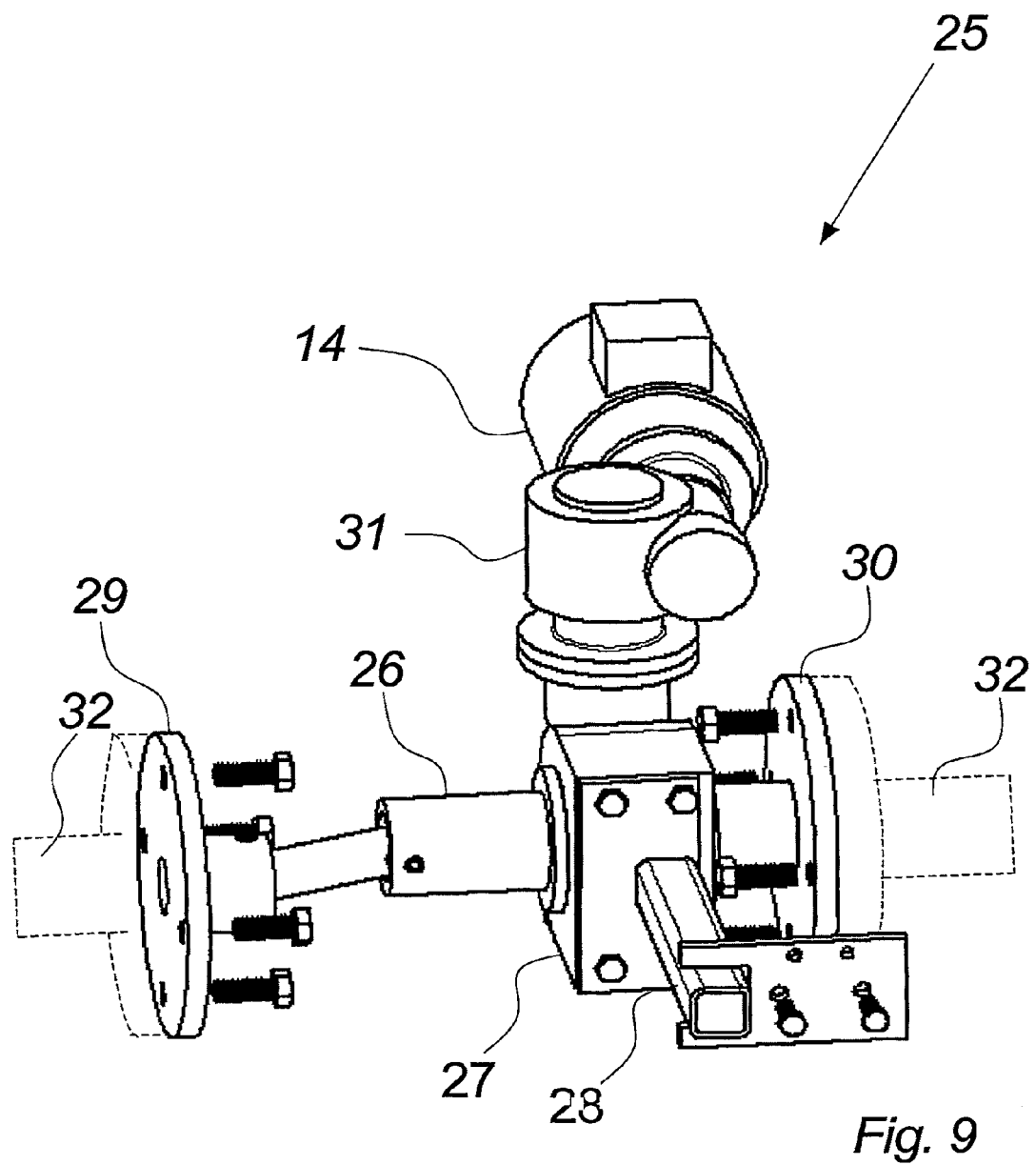
FIG. 9 illustrates a further preferred embodiment of a nacelle including an auxiliary device.

FIG. 9 illustrates a further embodiment of connection means between an auxiliary device and the rotating means of a nacelle.

The rotating means being the high-speed shaft ends 32 of the gear and generator and the connection means including a cardan coupling system 25, temporarily connecting the gear and generator during the transportation in a flexible manner.

The cardan shaft system includes a gear and generator flange bushing 29, 30 ensuring the connection of the cardan coupling system to the high-speed shafts. From the gear flange bushing 29 a cardan shaft 26 extends that ends in gearing means 27. The gearing means is also connected with a shaft to the generator flange bushing 30 and through transmission means 31 to the auxiliary device 14. In order to fixate the gearing means in relation to the nacelle the gearing means further comprises securing means 28, the securing means preferably being a metal tube or bar engaging with a plate secured to the nacelle.

The auxiliary device may preferably in the embodiment be an electric motor transferring force through the transmission and gearing means to the shafts of the nacelle gear and generator.

It shall be emphasized that the cardan shaft system may easily be modified to move just the gear or just the generator.

As mentioned above, the auxiliary device may also be used in connection with long periods of standstill for the rotation means of a wind turbine beside the period of transportation. Examples of standstill periods may be longer periods of storage in storage facilities. The auxiliary device may receive its power from a separate power supply such as the public electricity grid.

The invention has been exemplified above with reference to specific examples. However, it should be understood that the invention is not limited to the particular examples described above but may be used in connection with a wide variety of applications. Further, it should be understood that especially the auxiliary device according to the invention may be designed in a multitude of varieties within the scope of the invention as specified in the claims.

What is claimed is:

1. A nacelle for a wind turbine defining an enclosed space, comprising:
    a rotating device comprising a gear or a generator including one or more shafts;
    at least one auxiliary device being secured to a fixed position in the nacelle in relation to the rotating device, the auxiliary device being able to store, generate or convert energy during transportation of the nacelle; and
    a control system for controlling the at least one auxiliary device based at least in part on one or more input parameters, the control system including data storage having thresholds of input parameters for determining control of the auxiliary device;
    wherein the at least one auxiliary device is adapted to transfer energy to the rotating device during transportation; and
    wherein the at least one auxiliary device is adapted to move the rotating device continuously or discontinuously from a position to another position during transportation or standstill of the wind turbine nacelle.

2. The nacelle for a wind turbine according to claim 1, where a connection is established to one or more shafts of the rotating device.

3. The nacelle for a wind turbine according to claim 1, wherein the auxiliary device is secured to the nacelle via a securing device and is connected to the rotating device via a connector.

4. The nacelle for a wind turbine according to claim 3, wherein the connector is a belt arrangement including a belt, belt pulleys at said one or more shafts, at least one bracket secured to a position in the nacelle and a belt pulley of the at least one auxiliary device.

5. The nacelle for a wind turbine according to claim 4, wherein the gear or the generator belt pulleys have different sizes in relation to the belt pulley of the at least one auxiliary device.

6. The nacelle for a wind turbine according to claim 3, wherein the connector is a cardan coupling system flexibly connecting high-speed shaft ends of the gear or the generator with the at least one auxiliary device.

7. The nacelle for a wind turbine according to claim 6, wherein the cardan shaft system includes gearing device in the connection between the shafts and the at least one auxiliary device.

8. The nacelle for a wind turbine according to claim 1, wherein the transportation is performed with a transportation device comprising a truck, a train or a ship.

9. The nacelle for a wind turbine according to claim 8, wherein the at least one auxiliary device is connected to one or more energy generating systems of the transportation device, the systems comprising electric generators, pneumatic or hydraulic pumps.

10. The nacelle for a wind turbine according to claim 1, wherein the rotating device is mounted on the nacelle with flexible rubber bushings.

11. The nacelle for a wind turbine according to claim 1, wherein the nacelle further comprises one or more oil lubrication pumps supplying lubrication to the rotating device, the one or more oil lubrication pumps being controlled at least in part by the control system.

12. An auxiliary device for moving a rotating device of a wind turbine during transportation or standstill of said wind turbine, comprising:
    a securing device for securing the auxiliary device to a fixed position in relation to said rotating device;
    a connector for connecting the auxiliary device to the rotating device;
    a converter for converting an internal or external energy source to a mechanical force; and
    a controller for controlling the auxiliary device based at least in part on one or more input parameters, the controller including data storage having thresholds of input parameters for determining control of the auxiliary device;

the connector adapted to continuously or discontinuously transfer the mechanical force to the rotating device via the connection to the rotating device.

13. The auxiliary device according to claim 12, wherein the connector is connected to a shaft of the rotating device, the shaft comprising a high-speed shaft of a gear or a generator.

14. The auxiliary device according to claim 13, wherein the connector is a belt arrangement including a belt, belt pulleys at the shaft, at least one bracket secured to a position in the rotating device and a belt pulley of the auxiliary device.

15. The auxiliary device according to claim 14, wherein the gear or the generator belt pulleys have different sizes in relation to belt pulley of the auxiliary device.

16. The auxiliary device according to claim 13, wherein the connector is a cardan coupling system flexibly connecting the high-speed shaft ends of the gear or the generator with the auxiliary device.

17. The auxiliary device according to claim 16, wherein the cardan shaft system includes a gearing device in the connection between the shaft and said auxiliary device.

18. The auxiliary device according to claim 12, wherein the internal or external energy source comprises: motors supplied with electric power, engines fuelled with diesel, gasoline or other fossil fuels, helical or leaf springs or torsion bars, or pneumatic or hydraulic systems supplied with compressed air or hydraulic oil, respectively.

19. The auxiliary device according to claim 12, wherein the internal or external energy source comprises electric accumulators, pneumatic or hydraulic storages, or solar cells such as movable carpets of solar cells.

20. The auxiliary device according to claim 12, wherein the auxiliary device is connected to the rotating device before start of the transportation or standstill.

21. The nacelle for a wind turbine according to claim 1, wherein the one or more input parameters comprises one or more of: rotating device turning speed, vibration detection, energy level.

22. The nacelle for a wind turbine according to claim 1, wherein the one or more input parameters comprises one or more of: outside air temperature, temperature in the nacelle, gear temperature, generator bearing temperature, oil temperature.

23. The nacelle for a wind turbine according to claim 1, wherein the one or more input parameters comprises a time signal.

24. The nacelle for a wind turbine according to claim 1, wherein the one or more input parameters comprises one or more of: oil film condition, oil pressure.

25. The nacelle for a wind turbine according to claim 1, further comprising a sensor wherein the sensor provides an input parameter.

26. The nacelle for a wind turbine according to claim 1, wherein moving of the rotating means is discontinuous.

27. The nacelle for a wind turbine according to claim 26, wherein moving of the rotating means comprises between 30 seconds and 20 minutes of movement in a set period of time.

28. The nacelle for a wind turbine according to claim 1, further comprising an alarm which is activated upon the detection of a harmful situation for the rotating device.

29. A nacelle for a wind turbine defining an enclosed space, comprising:
    a rotating device comprising a gear or a generator including one or more shafts;
    at least one auxiliary device being secured to a fixed position in the nacelle in relation to the rotating device, the auxiliary device being able to store, generate or convert energy during transportation of the nacelle; and
    a control system for controlling the at least one auxiliary device based at least in part on one or more input parameters, the control system including an alarm which is activated upon the detection of a harmful situation for the rotating device;
    wherein the at least one auxiliary device is adapted to transfer energy to the rotating device during transportation; and
    wherein the at least one auxiliary device is adapted to move the rotating device continuously or discontinuously from a position to another position during transportation or standstill of the wind turbine nacelle.

30. The nacelle of claim 29, wherein the alarm includes a signal that does one or more of the following: identifies the nacelle, identifies the problem affecting the rotating device, and locates the position of the nacelle.

31. The nacelle of claim 30, wherein the signal is a wireless signal.

32. The nacelle of claim 30, wherein the signal is transmitted to a remote control center.

33. A nacelle for a wind turbine defining an enclosed space, comprising:
    a rotating device comprising a gear or a generator including one or more shafts;
    at least one auxiliary device being secured to a fixed position in the nacelle in relation to the rotating device, the auxiliary device being able to store, generate or convert energy during transportation of the nacelle; and
    a control system for controlling the at least one auxiliary device based at least in part on one or more input parameters, the one or more input parameters including one or more of: outside air temperature, temperature in the nacelle, gear temperature, generator bearing temperature, oil temperature, oil film condition, oil pressure;
    wherein the at least one auxiliary device is adapted to transfer energy to the rotating device during transportation; and
    wherein the at least one auxiliary device is adapted to move the rotating device continuously or discontinuously from a position to another position during transportation or standstill of the wind turbine nacelle.

* * * * *